H. S. COE.
MINER'S AND ASSAYER'S SCALE.
APPLICATION FILED FEB. 21, 1910.
977,513.
Patented Dec. 6, 1910.
2 SHEETS—SHEET 1.
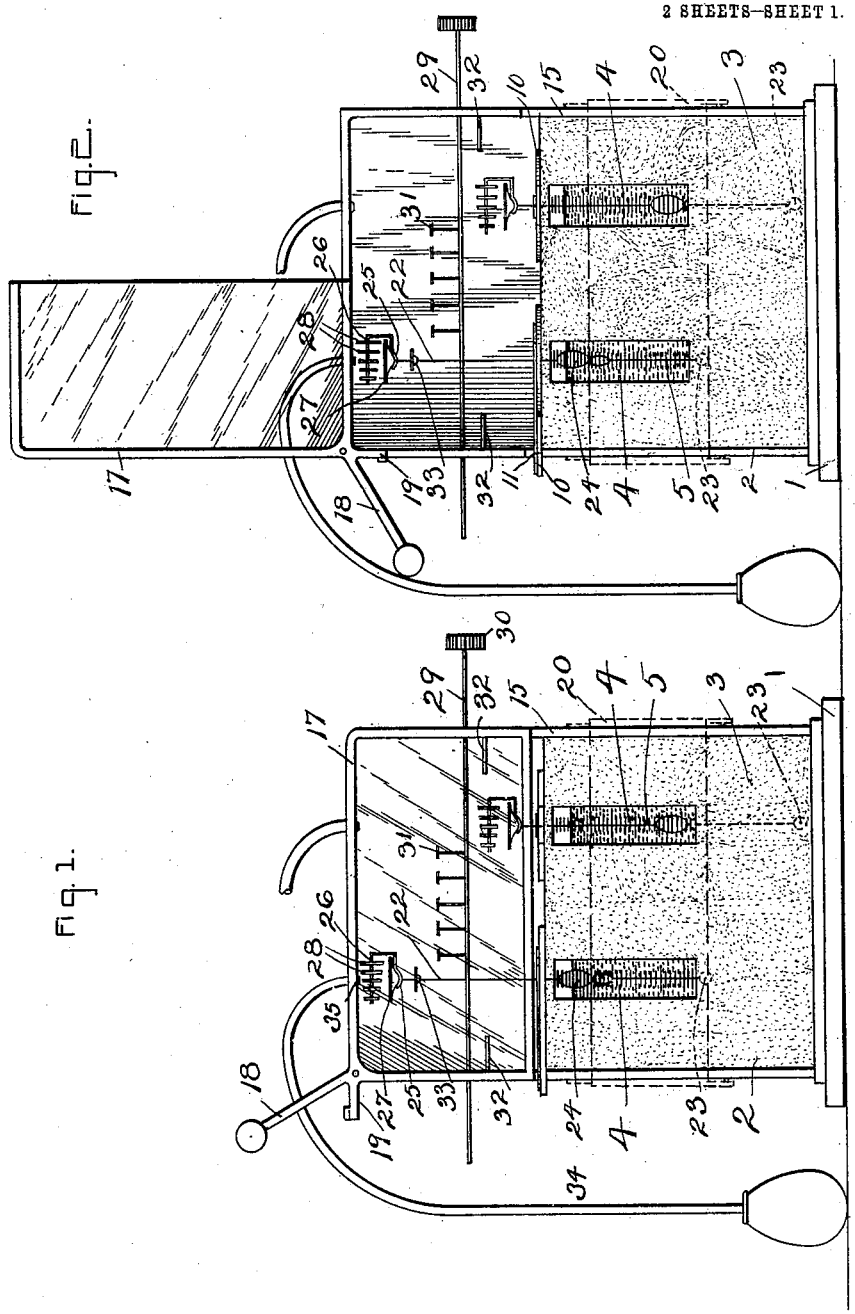

H. S. COE.
MINER'S AND ASSAYER'S SCALE.
APPLICATION FILED FEB. 21, 1910.
977,513.
Patented Dec. 6, 1910
2 SHEETS—SHEET 2.
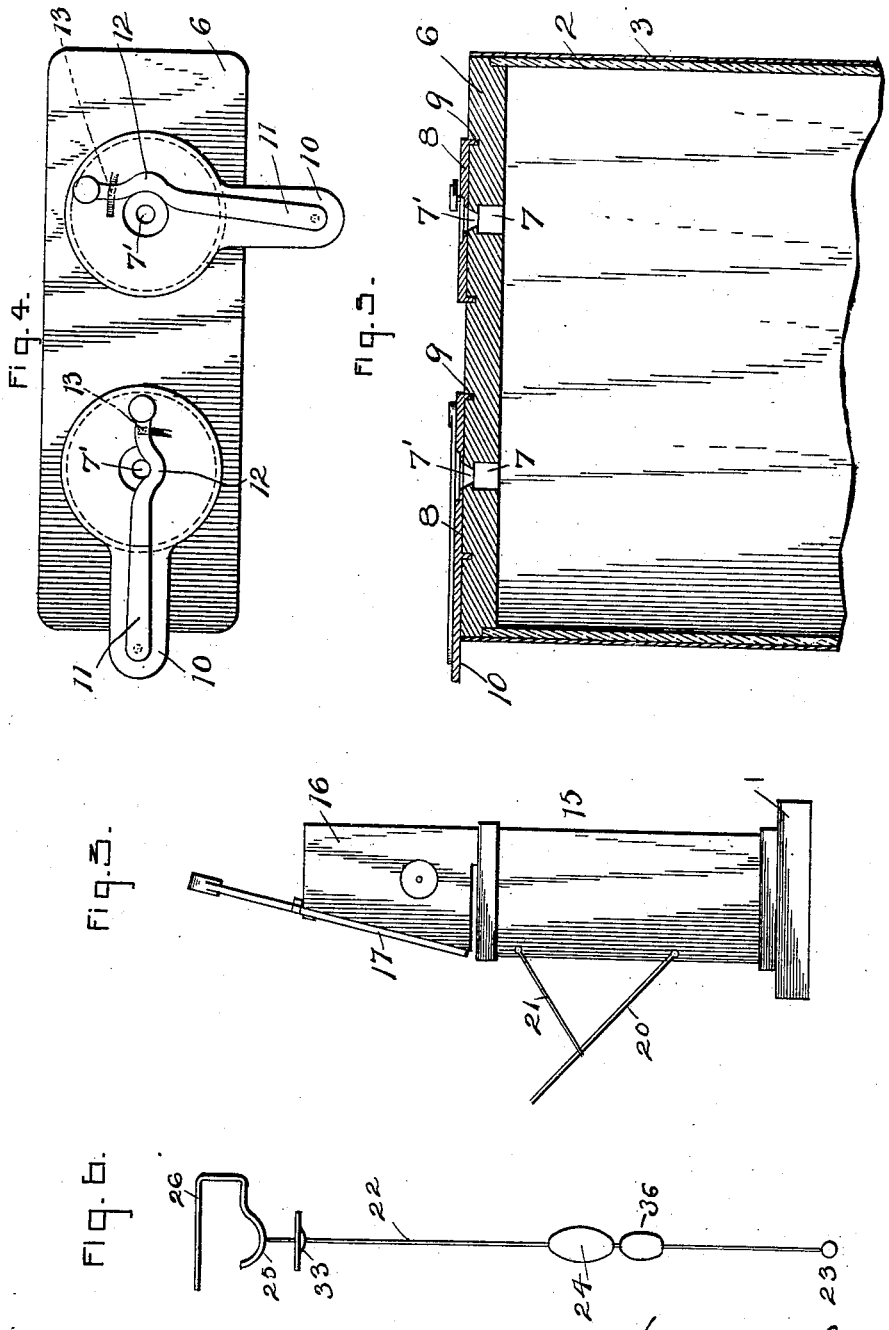

UNITED STATES PATENT OFFICE.

HARRISON S. COE, OF PALO ALTO, CALIFORNIA.

MINER'S AND ASSAYER'S SCALE.

977,513.     Specification of Letters Patent.     Patented Dec. 6, 1910.

Application filed February 21, 1910. Serial No. 545,001.

*To all whom it may concern:*

Be it known that I, HARRISON S. COE, a citizen of the United States, residing at Palo Alto, in the county of Santa Clara and State of California, have invented new and useful Improvements in Miners' and Assayers' Scales, of which the following is a specification.

This invention relates to miners' and assayers' scales and pertains particularly to a weighing instrument which depends on the buoyant effect of a liquid on the weighing element for the determination of the weight of the unknown quantity carried by the weighing element, and is therefore called by me a "liquid balance."

The principal object of my invention is to construct a balance which is capable of use in the determination of weights of minute quantities, such as are necessary in assayers' work, and is capable of determining minute quantities with absolute preciseness.

It is also an object to construct a balance of the above nature, which, while possessing all the requirements of a precise measuring instrument, is constructed of few parts, and may therefore be commercially produced, in furtherance of its adoption as a practical device.

Furthermore, it is an object to utilize the principle that the weight placed upon a partially submerged body will cause a displacement of the liquid in which the body is submerged, whose weight is equal to the weight placed upon the partially submerged body. As this is a physical principle which does not vary, its practical application to a device of the character hereinafter described will result in a weighing device of extreme preciseness, and easy manipulation.

With the above objects in view, and the object of constructing a device whose detail mechanism is adequate and practical, my invention will hereinafter be fully set forth and described, reference being had to the accompanying drawings, which form a part of this specification, and in which, Figure 1 is a front elevation of my liquid balance, showing a casing thereof closed, Fig 2 is a front elevation showing the casing opened to permit access to the working parts, Fig. 3 is an end view of the device, Fig. 4 is a plan view of the top or lid which is located upon the upper ends of the liquid receptacle, Fig. 5 is a detail vertical sectional view showing the top of the liquid receptacle, and Fig. 6 is a detail view of the scale pan holder and rider support.

Referring more particularly to said drawings, in which like numerals indicate like parts throughout, 1 indicates a base upon which a jar or receptacle 2 is mounted, said jar or receptacle 2 being formed of preferably transparent material. Said receptacle 2 is adapted to contain a liquid in which the weighing device can be submerged, and this liquid by preference is alcohol or any other liquid which is equally as voluble as alcohol.

In order to protect the receptacle 2 and device contents as much as possible from the variations of temperature, said receptacle is covered with a non-conducting sheathing 3 of felt or other suitable material. This covering material extends from the base 1 to the upper edge of the receptacle 2 covering the latter as completely as possible, but being provided with an aperture or apertures 4 according to the number of weighing elements provided for any one receptacle. Said apertures 4 are provided to permit inspection of the graduations 5 which are either cut into the material of the receptacle, or are formed on a transparent substance and suspended or otherwise fixedly secured within or on the outside surface of the receptacle. In order to render the reading of the characters accurate, sets of graduations 5 are arranged in pairs, one on the front and one on the rear side of the receptacle 2, on a common level, so that the operator by placing his eye on a level with the graduation may read, and, sighting through the liquid to the corresponding mark or indication on the rear scale, may thus be sure of the accuracy of his reading.

In practice, it is my invention to construct balances of the character described either with a single balancing device, or with duplicate balances of different degrees of sensitiveness, so that in the combined devices more than a single balance of a certain degree of efficiency will be available.

Reference to Figs. 4 and 5 will show the construction of the top which is provided for the receptacle 2, the showing in the drawings accompanying this specification providing for two balances. The top or lid 6 above referred to is formed of a suitable material, and is provided with apertures 7 through which the weighing devices project and operate, said apertures 7 consisting of lower cylindrical chambers surmounted by downwardly convergent conical openings 7'.

Mounted concentrically of the openings 7, and slidably resting upon the top 6 are annular plates 8, said plates being preferably provided with downwardly projecting flanges which slide or ride in corresponding grooves 9 formed in the lid 6. Said plates 8 are also provided with radially projecting members 10, having pairs of enlarged and comparatively broad handles. Said handles serve as grips for the manipulation of the plates 8, and also as supports or pivoted points for the ends of spring clamps 11. Said spring clamps 11 comprise metallic bars of spring material, pivoted at one end near the outer ends of the members 10, and having intermediate grooves or off-sets 12, said grooves or off-sets 12 occurring adjacent the openings 7. The lower faces of the spring grooves 12 are provided at suitable points with downwardly projecting lugs 13 which ride in grooves 14, said grooves having their bottoms arranged on an incline so that the groove gradually grows deeper as the piece 13 approaches the openings 7. Thus, as the spring clamps 12 are swung in an arc around their pivoted points, the off-sets 12 are carried toward the openings 7, and are permitted to approach, by reason of their resilience to the surface of the plates 8.

The sides and rear of the receptacle are inclosed in a casing 15, said casing projecting a substantial distance above the top of the receptacle 2, to form a housing 16 thereabove, the front of which is adapted to be closed by a sliding gate 17. The sliding gate 17 consists of a substantial receptacle frame in which is set a glass plate, to permit the interior of the balance to be inspected, while at the same time, the drafts are excluded from the interior of the device. The frame 17 is pivoted at one corner to the upper corner of the housing 16, and is provided with a counterbalancing arm 18 and a stop arm 19, the latter consisting of a right angular rearward projection which is adapted to bear against the side of the housing 16 when the frame 17 is thrown into its upward open position, the lower portion of the housing 16, and of the frame 17 is spaced from the top of the receptacle, to permit the swinging and manipulation of the plates 8 and the spring clamps 11 without raising the closure. The front of the frame is provided at a suitable height with a mirror 20, which is pivoted at its lower edge to the casing 15, and is adapted at such an incline by means of the stops 21, that the graduations 5 may be read therein without stooping down to the level of the graduations themselves.

One of the balancing or weighing portions of the device is shown in Fig. 6, and comprises, in general, a rigid supporting structure, a counterpoise, a float rider and weight support, and scale pan. The rigid supporting structure, indicated by numeral 22, is formed of a material which will have a comparatively small liquid displacing capacity, in comparison with its rigidity or supporting powers. For this purpose and reason, the support consists of a slender wire-like rod of suitable metallic material which will maintain its rigidity and form under the most strenuous of its tests. Located at its lower end is a weight or counterpoise 23, adapted to maintain the rod or support 22 in a vertical position by acting against a buoy or float 24 located intermediate the ends of the rod 22. The relative weights and counterbalancing powers of the float and counterpoise are so adjusted, that the device, when placed in the buoying liquid, will be supported with the float 24 submerged just below the surface of the liquid and near the upper end of the graduations or scale 5. The upper end of the rod 22 is surmounted by a scale-pan base 25 and a rider support 26. Said scale-pan base 25 is a dished metal plate secured to the upper end of the rod 22, and adapted to removably support a scale-pan 27, upon which the articles to be weighed are placed. Said rider support 26 comprises an overhanging arm which is also secured to the upper end of the rod 22 and projects upwardly and across the scale-pan 27, said support being adapted to removably carry a number of inches or weights of known quantity 28. The placing on and removal from the support of said riders 28 will effect the submergence of the support 22 in the liquid.

29 represents a rider-bar which is slidably journaled in the end walls of the housing 16, and is long enough to permit it to be reciprocatively slid transversely of the casing. A knurled head 30 permits the ready operation of the bar. Located on the bar 29, at suitable points, are the hook members 31, by means of which the riders may be lifted from or placed on the rider supports 26. Suitably secured to each side wall of the housing 16 is a projection or pin 32 upon which the riders may be hung when not required.

Mounted just below the pan-base 25, is an annular stop or lug 33 which is adapted to be engaged by the spring clamp 11, hereinbefore described, to hold the floating or weighing portion of the balance in a lowered and fixed position when it is desired to place the latter at rest to remove and place riders or quantities to be weighed.

The locking of the device is achieved by single engagement of the offset 12 of the clamp 11 around the stem of the rod 22 and over the lug 33. In order to obviate the necessity of handling the delicate balance with the hands, or to permit its actuation when the frame 17 is down, an air device is provided to press the balance down to be locked. To this end, tubes 34 are connected to nozzles 35 projecting through the lid of the housing directly on each scale pan, and a bulb or other suitable device is attached to the free end of each tube. Pressure upon the bulb causes a jet of air to blow upon the seat-pan and submerge the balance, until the lug 33 is low enough to be caught and clamped by the clamp 11.

From the above it is obvious that my improved scale or balance is simple, economical, and one which is readily and adequately adapted to perform its functions.

The operation of the apparatus is readily perceivable, and is performed as follows:— If the scale to be used is not in its lowered, and locked position, place it in this position by actuation of the bulb, and clamp as above described. After placing on the pan the particle or article to be weighed, release the device, and if the device does not rise, remove riders or weights from the rider support by means of the rider-bar, until an equilibrium or floating condition is reached. The value of the graduations 5 being determinable in units of weight, for the balances constructed as above described, it will be evident, that if a balance will float without the removal of the weights, the weight of the object upon the scale-pan is simply a matter of direct reading on the scales in openings 4. If, however, the load is such that weights must be removed to effect a floating condition of the balance, the weight will be reading of the graduations plus the total of the weights removed from the rider support to effect an equilibrium.

It has been found necessary to make provision for the expansion and contraction caused by changes of temperature in order to give the balance a constant floating point. This I have brought about by means of the hollow inverted shell 36. Said shell is or may be secured below the float 24 and presents a substantially egg-shaped appearance. The lower end thereof is open to give access to the interior thereof by the liquid, the latter standing only to a low level therein and confining a quantity of air. Thus, as the temperature varies, the confined air is expanded or contracted, and, as a consequence, expels or draws in the liquid, thereby automatically changing the weight of the device, and by compensation with the changed volume of the liquid, maintains the balance at a constant point of flotation.

What I claim and desire to secure by Letters Patent of the United States, is:—

1. A liquid balance, comprising, in combination, a receptacle, a housing and lid therefor, a liquid contained in said receptacle, a rod floated in said liquid and projecting through said lid, a scale-pan and removable weights carried by said rod, means for fixedly clamping said rod, and means for removing and replacing said weights, said clamping means comprising a revoluble plate mounted concentrically of said rod and a resilient clamping member pivotally mounted thereon, whereby said rod may be clamped from any circumferential position.

2. A liquid balance, comprising, in combination, a receptacle, a housing and lid therefor, a liquid contained in said receptacle, a rod floated in said liquid and projecting through said lid, a scale-pan and removable weights carried by said rod, a clamp on said lid for clamping said rod in fixed position, means for positioning said clamp to engage said rod from any side and means for removing and replacing said weights.

3. A liquid balance, comprising, in combination, a receptacle, a housing and lid therefor, a liquid contained in said receptacle, a rod floated in said liquid and projecting through said lid, a scale-pan and removable weights carried by said rod, a projection on said rod below said scale-pan, a clamp slidable on said lid and being adapted to engage said projection on said rod to clamp the latter in a fixed position, and means for removing and replacing said weights.

4. A liquid balance, comprising, in combination, a receptacle, a housing and lid therefor, a liquid contained in said receptacle, a rod floated in said liquid and projecting through said lid, a scale-pan and removable weights carried by said rod, a spring clamp having an offset adapted to encircle said rod to clamp the latter in fixed position, and means for removing and replacing said weights.

5. A liquid balance, comprising, in combination, a receptacle, a housing therefor, a liquid in said receptacle, a vertically buoyed balance floated in said liquid, and means to manipulate said balance, said balance comprising a vertical rod, a counterpoise at the lower end thereof, a buoy at its middle, a scale-pan base and rider support at its upper end, and scale-pan and riders carried thereby.

6. A liquid balance, comprising, in combination, a receptacle, a housing therefor, a liquid in said receptacle, a vertically buoyed balance floated in said liquid, means to manipulate said balance, and means to read the variations of its position, said reading means comprising pairs of sets of graduations and a reading mirror to reflect the coincidence of the pairs of graduations.

7. A liquid balance, comprising, in combination, a receptacle, and a liquid therein, a vertically buoyed rod floated in said liquid, scale-pan and weights carried by said rod, a clamp located to embrace said rod at any circumferential point to fix said rod, and means for removing from and placing said weights on said rod, said clamp consisting of a member revoluble around said rod, a resilient member pivoted on said revoluble member and a projection on said pivoted member which rides in an inclined groove in said revoluble member to maintain a frictional engagement between said members.

8. A liquid balance, comprising, in combination, a receptacle and a liquid therein, a vertically buoyed rod floated in said liquid and scale-pan and weights carried by said rod, and means comprising a hollow shell carried by said rod and mounted to retain a quantity of air to maintain a constant floating point under various fluctuations of temperature.

9. A liquid balance, comprising, in combination, a receptacle and a liquid therein, a vertically buoyed rod floated in said liquid and scale-pan and weights carried by said rod, and a hollow inverted shell carried by said rod below the surface of the liquid to confine a quantity of air which contracts and expands to vary the quantity of liquid admitted therein under various temperature conditions.

In testimony whereof I have hereunto set my hand in presence of two subscribing witnesses.

HARRISON S. COE.

Witnesses:
L. M. FOUTS, Jr.
DAVID H. COLLIER.